(12) United States Patent
Cunningham et al.

(10) Patent No.: US 10,585,894 B2
(45) Date of Patent: Mar. 10, 2020

(54) SYSTEMS AND METHODS FOR PRELOADING CONTENT

(71) Applicant: Facebook, Inc., Menlo Park, CA (US)

(72) Inventors: Benjamin Grady Cunningham, New York, NY (US); Shannon Ma, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/365,623

(22) Filed: Nov. 30, 2016

(65) Prior Publication Data

US 2018/0150441 A1    May 31, 2018

(51) Int. Cl.
*G06F 17/00* (2019.01)
*G06F 16/2455* (2019.01)
*G06F 16/957* (2019.01)
*G06F 40/103* (2020.01)

(52) U.S. Cl.
CPC ...... *G06F 16/2455* (2019.01); *G06F 16/9574* (2019.01); *G06F 40/103* (2020.01)

(58) Field of Classification Search
CPC .................................................. G06F 9/4443
See application file for complete search history.

(56) References Cited

U.S. PATENT DOCUMENTS

| | | | |
|---|---|---|---|
| 2004/0107403 A1* | 6/2004 | Tetzchner | G09G 5/00 715/227 |
| 2008/0139191 A1* | 6/2008 | Melnyk | H04L 67/2823 455/419 |
| 2009/0031216 A1* | 1/2009 | Dressel | G06F 17/3089 715/255 |
| 2014/0250393 A1* | 9/2014 | Goodson | G06F 3/0484 715/765 |
| 2014/0344714 A1* | 11/2014 | Toyoshima | G06F 3/04842 715/752 |

* cited by examiner

*Primary Examiner* — Andrew T McIntosh
(74) *Attorney, Agent, or Firm* — Sheppard Mullin Richter & Hampton LLP

(57) ABSTRACT

Systems, methods, and non-transitory computer-readable media can present a content feed through a display screen, the content feed including one or more content items. At least one content item in the content feed for which a layout is to be generated can be determined. The layout for the content item can be generated prior to the content item being accessed.

15 Claims, 7 Drawing Sheets

SYSTEMS AND METHODS FOR PRELOADING CONTENT

FIELD OF THE INVENTION

The present technology relates to the field of content presentation. More particularly, the present technology relates to techniques for preloading content prior to presentation.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to present a content feed through a display screen, the content feed including one or more content items. At least one content item in the content feed for which a layout is to be generated can be determined. The layout for the content item can be generated prior to the content item being accessed.

In some embodiments, the systems, methods, and non-transitory computer readable media are configured to determine that at least a portion of the content item included in the content feed is positioned within a predetermined region of the display screen.

In some embodiments, the content feed is provided using a main execution thread and wherein the layout for the content item is determined using one or more background threads.

In some embodiments, the systems, methods, and non-transitory computer readable media are configured to determine that the content item has been accessed and render the content item for presentation on the display screen, the rendering being performed based at least in part on the layout that was determined prior to the content item being accessed.

In some embodiments, the systems, methods, and non-transitory computer readable media are configured to obtain structured data corresponding to the content item from a content provider, obtain one or more view blocks corresponding to the structured data, where each view block corresponds to at least a portion of content included in the content item, and determine the layout based at least in part on the one or more view blocks.

In some embodiments, a view block corresponds to at least one of a title of the content item, a portion of text in the content item, an image in the content item, or a video in the content item.

In some embodiments, the systems, methods, and non-transitory computer readable media are configured to determine a respective size for at least one view block, the size being determined based at least in part on the portion of content to which the view block corresponds.

In some embodiments, the systems, methods, and non-transitory computer readable media are configured to determine a rendering of a portion of content to which the view block corresponds, the portion of content being rendered for presentation through the display screen of the computing device.

In some embodiments, the rendering is based at least in part on a set of design guidelines for formatting content in the content item.

In some embodiments, the set of design guidelines are provided by a publisher of the content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
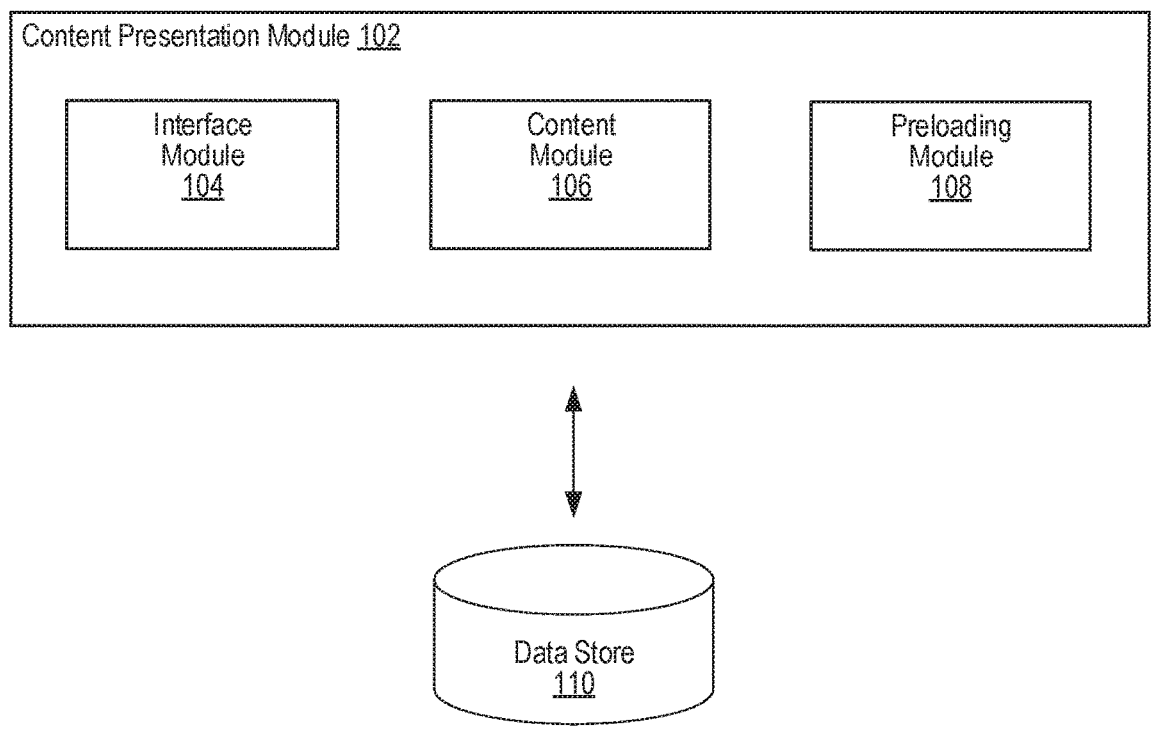
FIG. 1 illustrates an example system including an example content presentation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Preloading Content

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social network for consumption by others. Users of the social networking system may interact with other users and/or posts that were published through the social networking system.

Under conventional approaches, content items may be created, or formatted, as structured data using some markup language. In one example, a content item may be formatted using the Hyper Text Markup Language (HTML). Such conventional approaches typically format the content item using a box model in which each element (e.g., HTML element) in the content item is represented as a rectangular box. Each box can correspond to some content and various attributes associated with the box can be defined to customize the box. For example, attributes corresponding to the box's margins, borders, and padding can be specified and this information can be used to position the box when the content item is being rendered. In general, such content items are rendered by the software application (e.g., web browser) upon being accessed. The rendering of such content items is typically performed on the main execution thread. As a result, the user typically has to wait for each element of the content item to fully render in the web browser after accessing the content item. Such rendering delays can degrade the user experience and, in some instances, may affect user engagement with content items. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, the rendering and presentation of a content item to a user can be optimized by performing some, or all, of the operations for determining a layout of the content item prior to the user accessing the content item. For example, a user operating a computing device may access a content feed in which one or more content items are included. This content feed may be accessible through a software application running on the computing device. Each content item in the content feed may be presented as a snippet (or portion) of the content item. The user can select the snippet of the content item from the content feed to access the content item in its entirety. In one example, the content item may be a news article. Once the user selects (e.g., accesses) the snippet of the news article, the news article may be presented through the interface in its entirety. In some embodiments, data describing the content item can be determined in advance prior to the user accessing the content item. For example, one or more background threads running on the computing device can be utilized to download data describing the content item. These background threads can also be used to determine a layout for the content item that is optimized for the display screen of the computing device on which the content item may be presented. As a result, the amount of time needed to present the content item to the user is reduced thereby helping improve the overall user experience.

FIG. 1 illustrates an example system 100 including an example content presentation module 102, according to an embodiment of the present disclosure. As shown in the example of FIG. 1, the content presentation module 102 can include an interface module 104, a content module 106, and a preloading module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the content presentation module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content presentation module 102 can be implemented, in part or in whole, as software running on one or more computing devices or systems, such as on a user computing device or client computing system. For example, the content presentation module 102, or at least a portion thereof, can be implemented as or within an application (e.g., app), a program, or an applet, etc., running on a user computing device or a client computing system, such as the user device 610 of FIG. 6. Further, the content presentation module 102, or at least a portion thereof, can be implemented using one or more computing devices or systems that include one or more servers, such as network servers or cloud servers. In some instances, the content presentation module 102 can, in part or in whole, be implemented within or configured to operate in conjunction with a social networking system (or service), such as the social networking system 630 of FIG. 6. It should be understood that there can be many variations or other possibilities.

In some embodiments, the content presentation module 102 can be configured to communicate and/or operate with the at least one data store 110 in the example system 100. The at least one data store 110 can be configured to store and maintain various types of data. In various embodiments, the at least one data store 110 can store data relevant to the function and operation of the content presentation module 102. One example of such data includes data corresponding to content items that are available to be presented by the interface module 104. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data. It should be appreciated that there can be many variations or other possibilities.

In various embodiments, the content presentation module 102 can utilize the interface module 104 and the content module 106 to provide content items to users. The interface module 104 can be configured to provide an interface (e.g., graphical user interface) through which content items can be presented and accessed. For example, the interface can be provided through a software application (e.g., a social networking application, browser, etc.) running on a computing device (e.g., the user device 610 of FIG. 6) being operated by a user. The user can interact with the interface, for example, by performing touch screen gestures through a display screen of the computing device.

The content module 106 can be configured to provide various types of content items that can be presented to users through the interface provided by the interface module 104. For example, the content module 106 can interact with a content provider system, such as the social networking system 630 of FIG. 6, to obtain various content items to be presented through the interface module 104. The content items can be presented through a display screen of the computing device, for example, as part of a content feed (e.g., news feed). Users can navigate (e.g., browse) the content feed through a display screen of the computing device to access the different content items that are available in the content feed. In some embodiments, the user can navigate the content feed by performing a scroll gesture to move up or down the content feed.

In various embodiments, the preloading module 108 is configured to perform operations for optimizing content delivery. For example, the preloading module 108 can obtain data corresponding to content items that are accessible to a user and can determine the respective layouts of some, or all, these content items ahead of time. As a result, the preloading module 108 eliminates some, or all, of the delay that can result when rendering such content items using existing approaches. More details regarding the preloading module 108 will be provided below in reference to FIG. 2.

Figure 2:
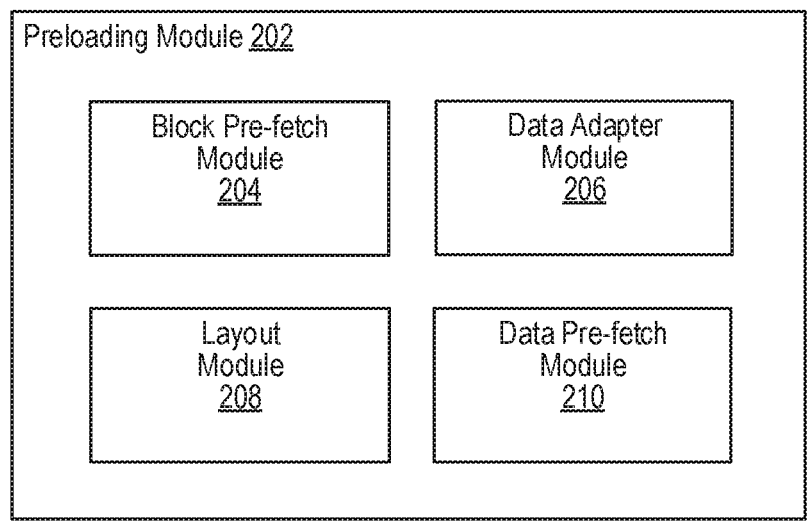
FIG. 2 illustrates an example of a preloading module, according to an embodiment of the present disclosure.

FIG. 2 illustrates an example preloading module 202, according to an embodiment of the present disclosure. In some embodiments, the preloading module 108 of FIG. 1 can be implemented with the preloading module 202. As shown in the example of FIG. 2, the preloading module 202 can include a block pre-fetch module 204, a data adapter module 206, a layout module 208, and a data pre-fetch module 210.

As mentioned, the preloading module 202 can optimize the delivery of content to computing devices. For example, a user operating a computing device may access a content feed in which one or more content items are included. This content feed may be accessible through an interface provided by a software application running on the computing device. In some embodiments, the content feed may be provided to the computing device by a content provider, e.g., a social networking system. Each content item in the content feed may be presented as a snippet (or portion) of the content item. A snippet of a content item can include information describing the content item (e.g., title, summary, text excerpt, images, frames, etc.) and can provide a link through which the respective content item can be accessed in full. Here, the user can select the snippet of the content item from the content feed to access the content item in its entirety.

In some embodiments, the block pre-fetch module 204 is configured to obtain data corresponding to a content item as soon as the content item is positioned within a viewport region of the interface. The viewport region may be defined by a specified set of pixel coordinates that correspond to the display screen of the computing device through which the interface is being accessed. For example, the block pre-fetch module 204 can interact with the content provider to obtain structured data describing the content item. In some embodiments, the block pre-fetch module 204 operates using one or more asynchronous background threads (e.g., a pre-fetch thread). In some embodiments, the content provider organizes the data describing the content item into one or more data blocks of structured data. For example, in some embodiments, some or all HTML elements referenced in the content item can be categorized into corresponding data blocks. In one example, data corresponding to an HTML element for an image (e.g., <img/>) can be categorized into an image data block. In another example, data corresponding to an HTML element for a text paragraph (e.g., <p/>) can be categorized into a text data block. In some embodiments, these data blocks may be more specific. For example, data corresponding to an HTML element for a paragraph (e.g., <p/>) can be categorized into a paragraph data block while data corresponding to an HTML element for a title (e.g., <title/>) can be categorized into a title data block. Each data block can also describe any attributes that are associated with the HTML element corresponding to the data block. For example, an image data block can specify the respective dimensions of the image (e.g., width, height, etc.), one or more URLs (Uniform Resource Locators) that reference different versions of the image (e.g., low resolution image, high resolution image, etc.), alternate text for the image, a border attribute, an hspace attribute, and a vspace attribute, to name some examples. In some embodiments, during this pre-fetch phase, the block pre-fetch module 204 only obtains information describing the various data blocks without actually downloading any media content (e.g., images, videos, sound, etc.). The HTML elements described above are provided merely as examples and, naturally, a corresponding data block may be created for categorizing any existing or customized HTML element. Moreover, the approaches described need not be limited to HTML elements and, depending on the implementation, corresponding data blocks may be utilized for any type of structured data.

In some embodiments, the data adapter module 206 converts the data blocks obtained by the block pre-fetch module 204 into respective view blocks. In some embodiments, the data adapter module 206 operates using one or more asynchronous background threads (e.g., a data adapter thread). These view blocks can be used by the layout module 208 to determine a layout of the content item for presentation on the display screen of the computing device. In general, a view block is a simplified version of a data block that includes the information (e.g., dimensions, text formatting, block positioning information with respect to the content item, links to content referenced in the content item, etc.) needed to construct a layout of the content item. For example, as mentioned, an image data block can specify the respective dimensions of the image (e.g., width, height, etc.), one or more URLs (Uniform Resource Locators) that reference different versions of the image (e.g., low resolution image, high resolution image, etc.), alternate text for the image, a border attribute, an hspace attribute, and a vspace attribute, to name some examples. In some embodiments, the corresponding image view block for this image can include an abstracted subset of the information that is included in the image data block. For example, the image view block can simply specify the information needed to determine a layout using the image view block, e.g., the respective dimensions of the image (e.g., width, height, etc.), the position of the image in the content item, and the one or more URLs (Uniform Resource Locators) that reference different versions of the image (e.g., low resolution image, high resolution image, etc.). In some embodiments, when converting data blocks corresponding to text into view blocks, the data adapter module 206 also includes various text formatting information in the respective view blocks. For example, in some embodiments, a title data block generally includes a raw text string that corresponds to the title of the content item. In this example, the corresponding title view block can include formatting information including, for example, the font, line height, style, to name some examples. In another example, a view block corresponding to a paragraph data block can include formatting information for the paragraph, identify any links included in the paragraph, and positioning information for the view block with respect to the content item. Such view blocks, therefore, provide a lightweight representation of the various data (e.g., text, images, videos, etc.) to be included in the layout of the content item.

Once the data adapter module 206 has determined the respective view blocks for each of the data blocks, the layout module 208 can determine the layout of the content item. In some embodiments, the layout module 208 operates using one or more asynchronous background threads (e.g., a layout thread). As a result, the layout module 208 is able to construct the layout in the background before the user has accessed the content item. The layout module 208 is configured to order the various view blocks corresponding to the content item into a layout that is customized for the display screen of the computing device. Using the various information included in each of the view blocks, the layout module 208 is able to determine the ordering, or dependencies, of the various view blocks. For example, a content item may include a title view block, a main image view block, a paragraph view block, a side image view block. In this example, the layout module 208 can determine that the main image view block is positioned at the top of the content item, followed by the title view block, which is followed by the paragraph view block, with the side image view block being positioned to the left of the paragraph view block. Thus, in this example, the title has a layout dependency on the main image, the paragraph has a layout dependency on the title, and the side image has a layout dependency on the paragraph. In effect, the layout module 208 determines a customized blueprint for the content item's layout for the display screen of the computing device.

In some embodiments, the layout module 208 treats each view block as a rectangle and appropriately sizes the view blocks depending on the content that is represented by the respective view block. In such embodiments, the layout of the content item can be constructed by organizing the view blocks (or rectangles) in an appropriate order. For example, in some embodiments, a view block that corresponds to text can be sized by rendering the text based, in part, on a set of design guidelines that are accessible to the layout module 208. These design guidelines can define the appropriate fonts, text sizes, styles to be used for formatting text in the content item. In such embodiments, the layout module 208 is able to determine how much space (e.g., horizontal space, vertical space, etc.) the text will occupy in the content item when presented. In another example, a view block corresponding to an image can be sized based on the dimensions of the image. In this example, the layout module 208 is able to determine how much space (e.g., horizontal space, vertical space, etc.) the image will occupy in the content item when presented on the display screen of the computing device. The layout module 208 can similarly size each of the remaining view blocks that were determined by the data adapter module 206. In some embodiments, content publishers can specify their own set of design guidelines to be applied to their content items. In such embodiments, the layout module 208 can determine the publisher of the content item and can apply the appropriate set of design guidelines when processing view blocks corresponding to the content item.

In some embodiments, once the layout of the content item has been determined, the data pre-fetch module 210 can be configured to determine, based on the layout, which view blocks (or rectangles) will be visible on the display screen of the computing device when the content item is accessed. In some embodiments, the data pre-fetch module 210 obtains the data corresponding to the visible view blocks prior to the user accessing the content item. When the user does access the content item, the content item can initially be rendered using the pre-determined layout and, if obtained, the data corresponding to the visible view blocks. In some embodiments, the remaining data corresponding to the non-visible view blocks of the content item can be obtained after the initial rendering.

Figure 3:
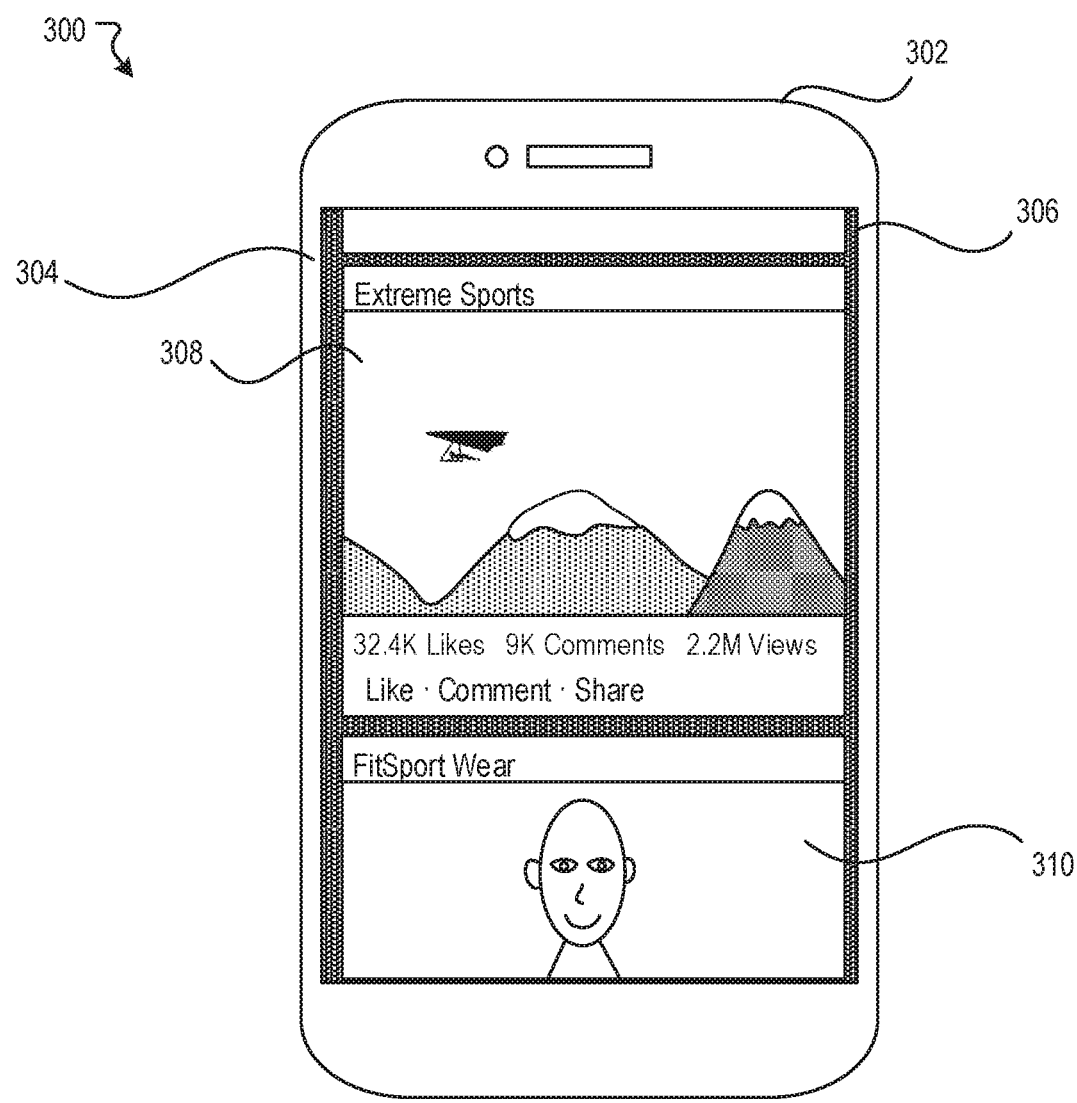
FIG. 3 illustrates an example interface through which content items are presented in a content feed, according to an embodiment of the present disclosure.

FIG. 3 illustrates an example 300 of an interface 304 through which content items 308, 310 are presented in a content feed 306, according to an embodiment of the present disclosure. In this example, the interface 304 is presented on a display screen of the computing device 302. Further, the interface 304 may be provided through an application (e.g., a social networking application, etc.) running on the computing device 302. The user operating the computing device 302 can scroll through the content feed 306, for example, by performing up or down scroll gesture. In the example of FIG. 3, the snippet of the content item 308 is shown as being located in the viewport region of the interface 304. As mentioned, in some embodiments, a layout for the content item 308 can be determined in response to the content item 308 being positioned within the viewport region prior to the user accessing the content item 308. In some embodiments, the interface 304 is provided by a main execution thread running on the computing device 302. In some embodiments, the layout can be determined using one or more asynchronous background threads running on the computing device 302. As a result, the pre-fetching of data related to the content item 308 and the determination of its layout can be determined in the background without the user's browsing of the content feed 306 being adversely affected.

Figure 4:
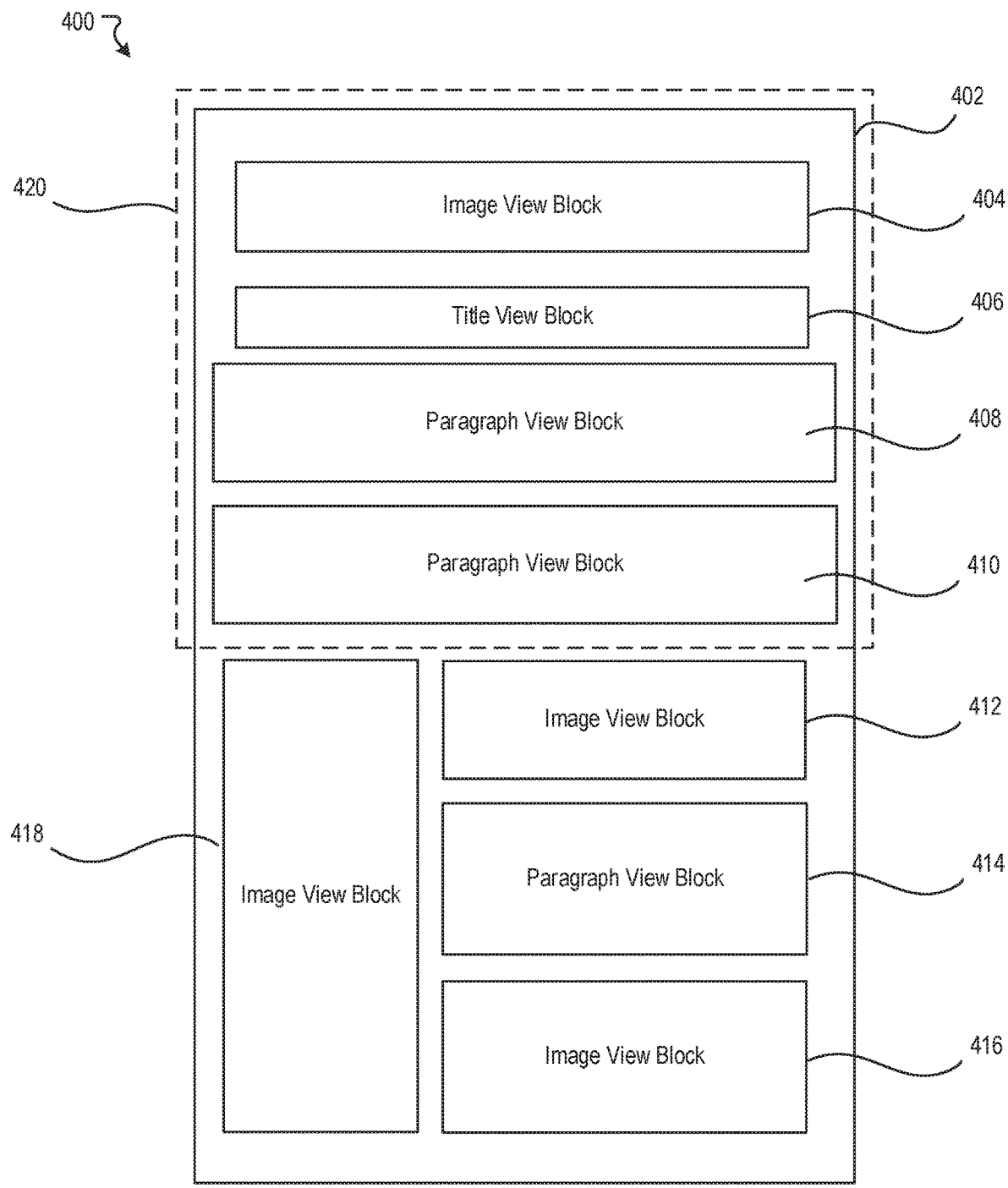
FIG. 4 illustrates an example diagram illustrating an approach for content prefetching, according to an embodiment of the present disclosure.

FIG. 4 illustrates an example diagram 400 illustrating an approach for content prefetching, according to an embodiment of the present disclosure. FIG. 4 includes a layout 402 of a content item (e.g., an article, story, web page, etc.). The layout 402 includes a set of view blocks corresponding to the content item that have been arranged accordingly for the content item. In this example, the layout 402 includes an image view block 404 at the beginning of the content item, a title view block 406, a first paragraph view block 408, a second paragraph view block 410, another image view block 412 below the second paragraph, a third paragraph view block 414, another image view block 416 below the third paragraph, and a side image view block 418.

As mentioned, in some embodiments, a computing device can be configured to determine, based on the layout 402, which view blocks will be visible on the display screen of the computing device when the content item is accessed. In this example, the visible area is illustrated using a box 420. As shown, the visible area includes the image view block 404, the title view block 406, the first paragraph view block 408, and the second paragraph view block 410. In some embodiments, the computing device can obtains, or pre-fetch, the data corresponding to the visible view blocks (e.g., the image view block 404, the title view block 406, the first paragraph view block 408, and the second paragraph view block 410) prior to the user accessing the content item. When the user does access the content item, the content item can initially be rendered using the pre-determined layout and the data corresponding to the visible view blocks. In this example, the computing device can download the image data corresponding to the image view block 404 in advance along with the text for the remaining visible view blocks. In some embodiments, the data corresponding to the non-visible view blocks of the content item is not obtained in advance and may be obtained after the initial rendering is complete. Thus, in the example of FIG. 4, the data corresponding to the non-visible view blocks, e.g., the image view block 412, the third paragraph view block 414, the image view block 416, and the side image view block 418 is not pre-fetched.

Figure 5:
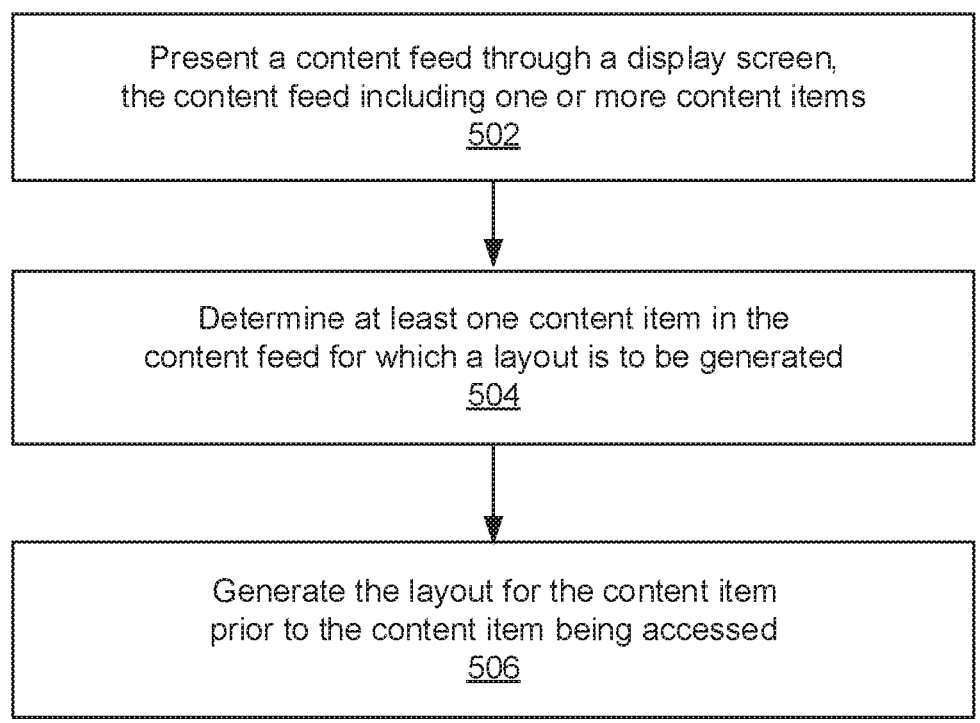
FIG. 5 illustrates an example method for determining a content item layout, according to an embodiment of the present disclosure.

FIG. 5 illustrates an example method 500 for determining a content item layout, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can present a content feed through a display screen, the content feed including one or more content items. At block 504, at least one content item in the content feed for which a layout is to be generated can be determined. At block 506, the layout for the content item can be generated prior to the content item being accessed.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
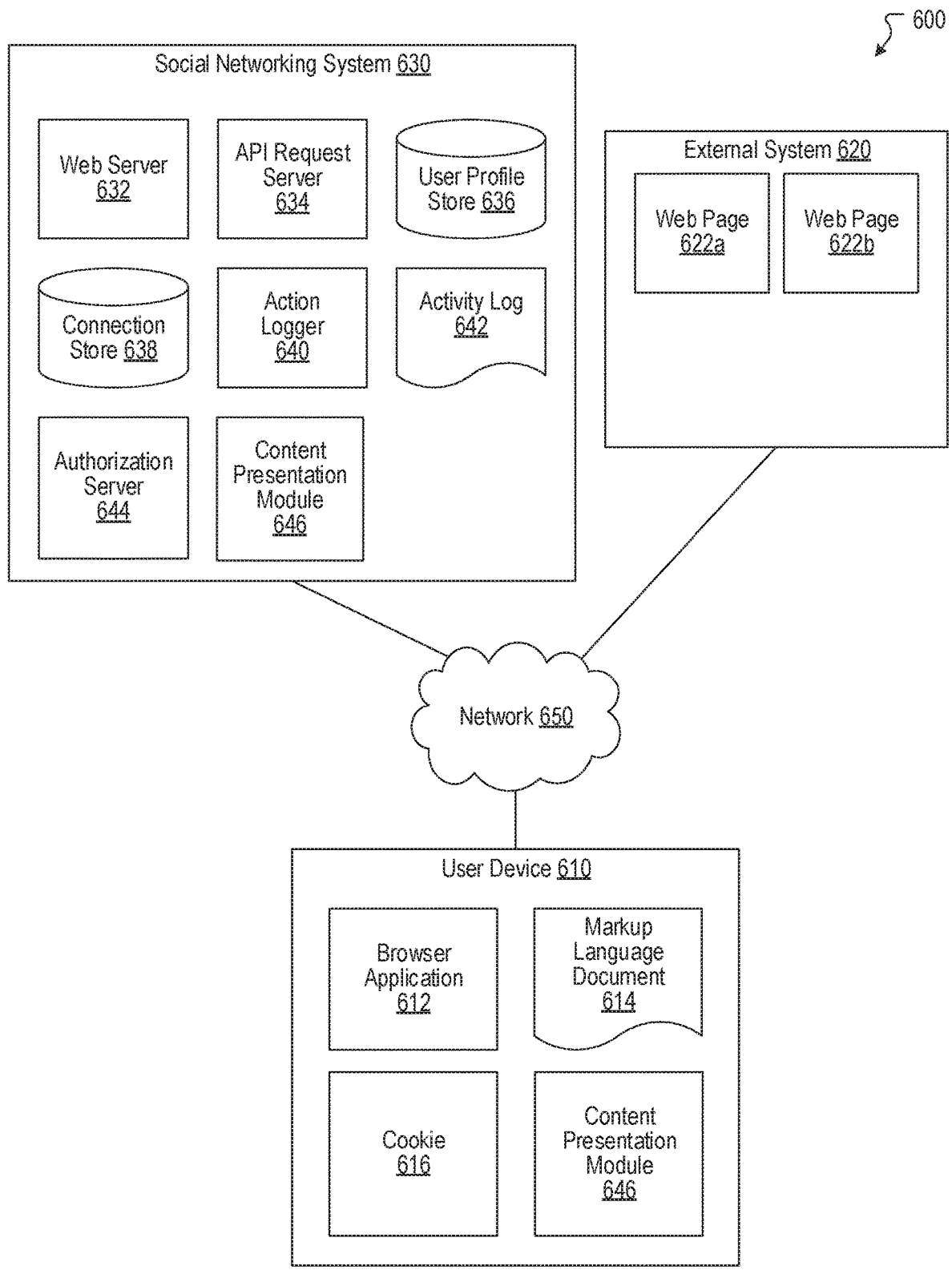
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 and/or the social networking system 630 can include a content presentation module 646. The content presentation module 646 can, for example, be implemented as the content presentation module 102 of FIG. 1. As discussed previously, it should be appreciated that there can be many variations or other possibilities.

Hardware Implementation

Figure 7:
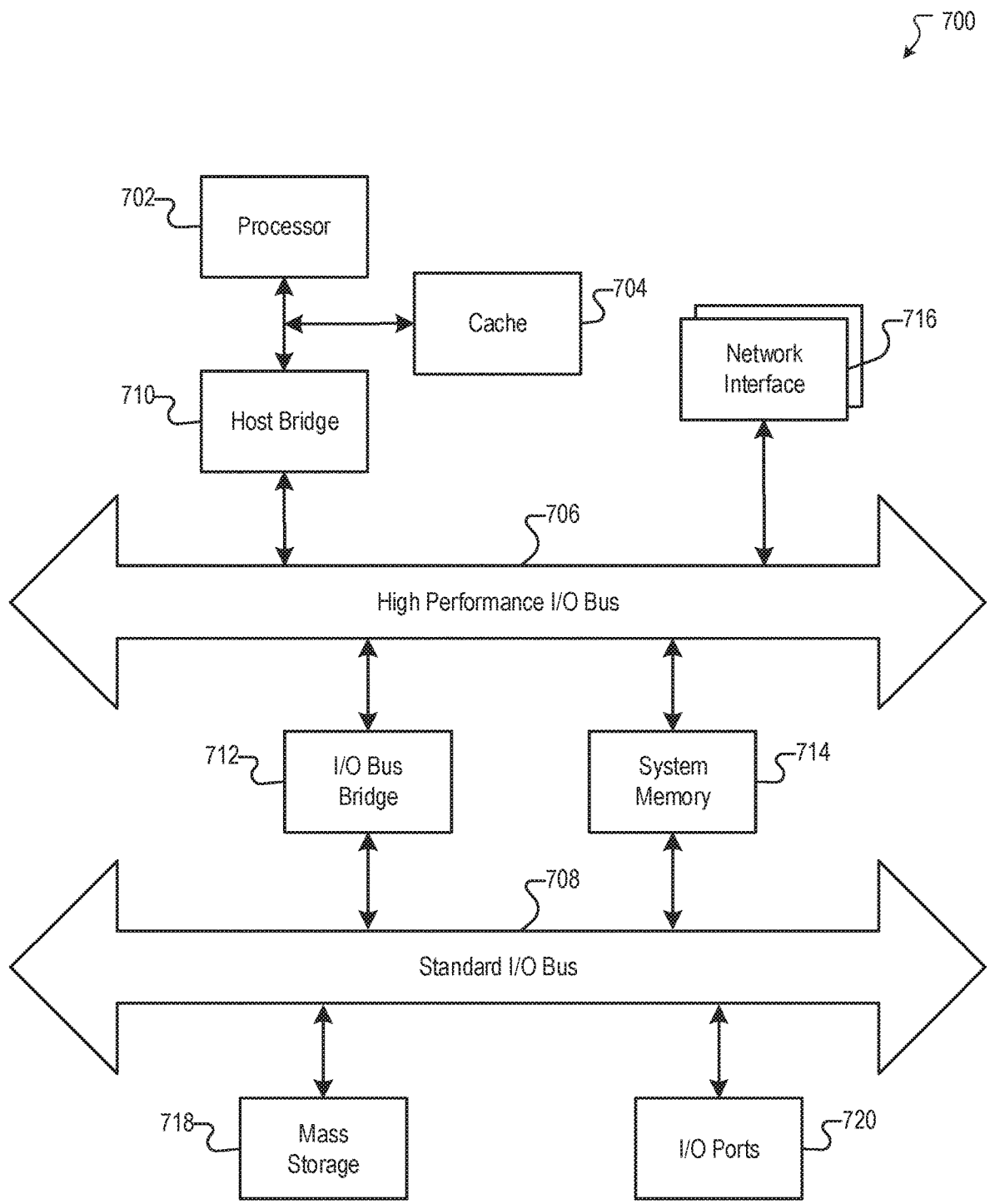
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/ output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    presenting, by a computing device, a content feed through a display screen, the content feed including one or more content items;
    determining, by the computing device, at least one content item in the content feed for which a layout is to be generated, the determining comprising:
       determining, by the computing device, that at least a portion of the content item included in the content feed is positioned within a predetermined region of the display screen;
    based upon the at least the portion of the content item being positioned within the predetermined region of the display screen, generating, by the computing device, the layout for the content item prior to the content item being accessed, wherein generating the layout further comprises:
       obtaining, by the computing device, at least one data block corresponding to the content item from a content provider, wherein the at least one data block corresponds to one or more HyperText Markup Language (HTML) elements associated with the content item;
       determining, by the computing device, a plurality of view blocks based on the at least one data block, the plurality of view blocks including both visible view blocks and non-visible view blocks associated with the at least one content item, wherein each view block is a simplified version of a portion of the at least one data block, each view block including information for constructing a portion of the layout of the content item, and wherein at least some information needed to construct the layout is determined based on a set of design guidelines provided by a publisher of the content item; and
       rendering, by the computing device, the content item based at least in part on the visible view blocks included in the plurality of view blocks prior to the content item being accessed, wherein data associated with the non-visible view blocks is obtained and rendered after the rendered content item is accessed.

2. The computer-implemented method of claim 1, wherein the content feed is provided using a main execution thread and wherein the layout for the content item is determined using one or more background threads.

3. The computer-implemented method of claim 1, the method further comprising:
    determining, by the computing device, that the content item has been accessed; and
    rendering, by the computing device, the content item for presentation on the display screen, the rendering being performed based at least in part on the layout that was determined prior to the content item being accessed.

4. The computer-implemented method of claim 1, wherein a view block corresponds to at least one of a title of the content item, a portion of text in the content item, an image in the content item, or a video in the content item.

5. The computer-implemented method of claim 1, wherein generating the layout further comprises:
    determining, by the computing device, a respective size for at least one view block, the size being determined based at least in part on the portion of content to which the view block corresponds.

6. The computer-implemented method of claim 5, wherein determining a respective size for at least one view block further comprises:
    determining, by the computing device, a rendering of a portion of content to which the view block corresponds, the portion of content being rendered for presentation through the display screen of the computing device.

7. The computer-implemented method of claim 6, wherein the rendering is based at least in part on a set of design guidelines for formatting content in the content item.

8. A system comprising:
    at least one processor; and
    a memory storing instructions that, when executed by the at least one processor, cause the system to perform:
       presenting a content feed through a display screen, the content feed including one or more content items;
       determining at least one content item in the content feed for which a layout is to be generated, the determining comprising:
          determining that at least a portion of the content item included in the content feed is positioned within a predetermined region of the display screen;
       based upon the at least the portion of the content item being positioned within the predetermined region of the display screen, generating the layout for the content item prior to the content item being accessed, wherein generating the layout further comprises:
          obtaining at least one data block corresponding to the content item from a content provider, wherein the at least one data block corresponds to one or more HyperText Markup Language (HTML) elements associated with the content item;
          determining a plurality of view blocks based on the at least one data block, the plurality of view blocks including both visible view blocks and non-visible view blocks associated with the at least one content item, wherein each view block is a simplified version of a portion of the at least one data block, each view block including information for constructing a portion of the layout of the content item, and wherein at least some information needed to construct the layout is determined based on a set of design guidelines provided by a publisher of the content item; and
          rendering the content item based at least in part on the visible view blocks included in the plurality of view blocks prior to the content item being accessed, wherein data associated with the non-visible view blocks is obtained and rendered after the rendered content item is accessed.

9. The system of claim 8, wherein the content feed is provided using a main execution thread and wherein the layout for the content item is determined using one or more background threads.

10. The system of claim 8, wherein the system further performs:
   determining that the content item has been accessed; and
   rendering the content item for presentation on the display screen, the rendering being performed based at least in part on the layout that was determined prior to the content item being accessed.

11. The system of claim 8, wherein generating the layout for the content item prior to the content item being accessed further causes the system to perform:
   obtaining structured data corresponding to the content item from a content provider;
   obtaining one or more view blocks corresponding to the structured data, where each view block corresponds to at least a portion of content included in the content item; and
   determining the layout based at least in part on the one or more view blocks.

12. A non-transitory computer-readable storage medium including instructions that, when executed by at least one processor of a computing system, cause the computing system to perform a method comprising:
   presenting a content feed through a display screen, the content feed including one or more content items;
   determining at least one content item in the content feed for which a layout is to be generated, the determining comprising:
      determining that at least a portion of the content item included in the content feed is positioned within a predetermined region of the display screen;
   based upon the at least the portion of the content item being positioned within the predetermined region of the display screen, generating the layout for the content item prior to the content item being accessed, wherein generating the layout further comprises:
      obtaining at least one data block corresponding to the content item from a content provider, wherein the at least one data block corresponds to one or more HyperText Markup Language (HTML) elements associated with the content item;
      determining a plurality of view blocks based on the at least one data block, the plurality of view blocks including both visible view blocks and non-visible view blocks associated with the at least one content item, wherein each view block is a simplified version of a portion of the at least one data block, each view block including information for constructing a portion of the layout of the content item, and wherein at least some information needed to construct the layout is determined based on a set of design guidelines provided by a publisher of the content item; and
      rendering the content item based at least in part on the visible view blocks included in the plurality of view blocks prior to the content item being accessed, wherein data associated with the non-visible view blocks is obtained and rendered after the rendered content item is accessed.

13. The non-transitory computer-readable storage medium of claim 12, wherein the content feed is provided using a main execution thread and wherein the layout for the content item is determined using one or more background threads.

14. The non-transitory computer-readable storage medium of claim 12, wherein the computing system further performs:
   determining that the content item has been accessed; and
   rendering the content item for presentation on the display screen, the rendering being performed based at least in part on the layout that was determined prior to the content item being accessed.

15. The non-transitory computer-readable storage medium of claim 12, wherein generating the layout for the content item prior to the content item being accessed further causes the computing system to perform:
   obtaining structured data corresponding to the content item from a content provider;
   obtaining one or more view blocks corresponding to the structured data, where each view block corresponds to at least a portion of content included in the content item; and
   determining the layout based at least in part on the one or more view blocks.

* * * * *